(12) United States Patent
Zhu et al.

(10) Patent No.: US 8,254,938 B2
(45) Date of Patent: Aug. 28, 2012

(54) METHOD FOR COORDINATED MULTI-CELL TRANSMISSION, CENTRAL CONTROLLER AND USER EQUIPMENT

(75) Inventors: Jianchi Zhu, Beijing (CN); Xiaoming She, Beijing (CN); Xiang Yun, Beijing (CN); Lan Chen, Beijing (CN)

(73) Assignee: NTT DOCOMO, Inc., Tokyo (JP)

( * ) Notice: Subject to any disclaimer, the term of this patent is extended or adjusted under 35 U.S.C. 154(b) by 267 days.

(21) Appl. No.: 12/840,171

(22) Filed: Jul. 20, 2010

(65) Prior Publication Data
US 2011/0034163 A1 Feb. 10, 2011

(30) Foreign Application Priority Data
Aug. 5, 2009 (CN) .......................... 2009 1 0161866

(51) Int. Cl.
*H04W 36/00* (2009.01)
*H04H 20/71* (2008.01)
*H04K 1/10* (2006.01)

(52) U.S. Cl. .......................... 455/444; 370/312; 375/260
(58) Field of Classification Search .................... 455/444
See application file for complete search history.

(56) References Cited

U.S. PATENT DOCUMENTS
2010/0027456 A1* 2/2010 Onggosanusi et al. ....... 370/312
* cited by examiner

*Primary Examiner* — Charles Appiah
*Assistant Examiner* — Natasha Cosme
(74) *Attorney, Agent, or Firm* — Blakely, Sokoloff, Taylor & Zafman LLP

(57) ABSTRACT

Embodiments of the present invention disclose a method for coordinated multi-cell transmission, a central controller and a User Equipment (UE). In one embodiment, the method includes: determining, by a central controller, at least one candidate cooperating set in a super-cell, wherein each cell in the super-cell belongs to at least one candidate cooperating set, and broadcasting information of the at least one candidate cooperating set determined to all UEs in the super-cell; selecting, by each UE, a candidate cooperating set from the at least one candidate cooperating set as a cooperating set of the UE, and feeding back information of the cooperating set selected to the central controller; and determining, by the central controller, all cooperating sets in the super-cell and UEs participating in cooperation in each cooperating set according to the information of the selected cooperating set fed back by each UE.

23 Claims, 3 Drawing Sheets

METHOD FOR COORDINATED MULTI-CELL TRANSMISSION, CENTRAL CONTROLLER AND USER EQUIPMENT

PRIORITY

The present application claims priority to and incorporates by reference the entire contents of Chinese patent application No. 200910161866.X, filed in China on Aug. 5, 2009.

FIELD OF THE INVENTION

The present invention relates to radio communication technologies, and more particularly, to a method for coordinated multi-cell transmission, a central controller in a super-cell and a User Equipment (UE) in a Long Term Evolution-Advanced (LTE-A) radio communication system.

BACKGROUND OF THE INVENTION

In an LTE-A system, with the decrease of a coverage area of cells and the trend that the frequency reuse factor approaches to 1, inter-cell interference has become a key problem which restricts the capacity of a cell. In order to improve spectral efficiency, a coordinated multi-cell transmission technique, also referred to as a Coordinated Multi-Point (CoMP) transmission technique, is proposed.

A basic idea of the coordinated multi-cell transmission is to associate multiple cells to transmit signals and share channel and data information of users in the associated cells through a wire channel such as fiber. The objective is to make the cells orthogonal to each other, so as to overcome the inter-cell interference and increase system throughput.

In the present invention, for facilitating the description, a set of multiple cells connected by the wire channel such as fiber is referred to as a super-cell. Generally, a super-cell is equipped with a central controller which has a core control function and is used for coordinating a coordinated transmission of the multiple cells. Except for the central controller, base stations of other cells may be configured as Remote Radio Equipment (RRE) without the core control function. It should be understood that, in order to overcome the inter-cell interference and increase throughput of the super-cell, all the cells in the super-cell may participate in the coordinated transmission at the same time. However, by this way, all the cells in the super-cell need to share a large amount of channel and user data information. As a result, the coordinated operation is rather complicated, while a coordinated gain obtained may be not high enough.

In order to solve the above problem of high complexity of the coordinated operation, the cells in the super-cell may be divided into at least one cooperating set which respectively participates in the coordinated transmission. In the existing LTE-A system, at least one cooperating set may be defined in advance in the super-cell. However, channel conditions of different users in the super-cell are different and channel information of a same user is also time-varying. Therefore, the manner of defining the cooperating set in advance lacks flexibility and cannot obtain a high coordinated gain. Besides, each user may select at least one cell according to its channel condition to form a cooperating set. However, in this manner, since different users may select different cooperating sets, the number of the cooperating sets may be rather large, which directly results in high complexity for scheduling of the cooperating sets. Therefore, a problem to be solved by the coordinated multi-cell transmission technique is how to dynamically determine cells and users participating in the coordinated transmission in the super-cell by considering both the performance of the coordinated transmission and the impact of the complexity.

SUMMARY OF THE INVENTION

In view of the above, embodiments of the present invention provide a method for coordinated multi-cell transmission, which dynamically determines cells and users participating in coordinated transmission in a super-cell by considering both a performance of the coordinated transmission and an impact of complexity.

According to an embodiment of the present invention, a method for coordinated multi-cell transmission is provided. The method includes:

determining, by a central controller, at least one candidate cooperating set in a super-cell, wherein each cell in the super-cell belongs to at least one candidate cooperating set, and broadcasting information of the at least one candidate cooperating set determined to all User Equipments (UEs) in the super-cell;

selecting, by each of the UEs, a candidate cooperating set from the at least one candidate cooperating set as a cooperating set of the UE, and feeding back information of the cooperating set to the central controller; and determining, by the central controller, all cooperating sets in the super-cell and UEs participating in cooperation in each cooperating set according to the information of the cooperating set fed back by each of the UEs.

According to another embodiment of the present invention, another method for coordinated multi-cell transmission is provided. The method includes:

determining, by a central controller, at least one candidate cooperating set in a super-cell, wherein each cell in the super-cell belongs to at least one candidate cooperating set, and broadcasting information of the at least one candidate cooperating set to all User Equipments (UEs) in the super-cell;

measuring, by each of all the UE, the at least one candidate cooperating set, and feeding back channel information obtained by measurement to the central controller; and selecting, by the central controller, a cooperating set from the at least one candidate cooperating set for each of the UEs according to the channel information fed back by each of the UEs, and determining all cooperating sets in the super-cell and UEs participating in cooperation in each cooperating set according to the cooperating set selected for each of the UEs.

According to yet another embodiment of the present invention, a central controller in a super-cell is provided. The central controller includes:

a candidate cooperating set determining unit, adapted to determine at least one candidate cooperating set in a super-cell, wherein each cell in the super-cell belongs to at least one candidate cooperating set; and adapted to broadcast information of the at least one candidate cooperating set determined to all UEs in the super-cell;

a cooperating set information obtaining unit, adapted to receive information of a cooperating set of a UE fed back by the UE; and a scheduling unit, adapted to determine all cooperating sets in the super-cell and UEs participating in cooperation in each cooperating set according to information of the cooperating sets selected by all the UEs.

According to yet another embodiment of the present invention, another central controller in the super-cell is provided. The central controller includes:

a candidate cooperating set determining unit, adapted to determine at least one candidate cooperating set in the super-cell, wherein each cell in the super-cell belongs to at least one candidate cooperating set; and adapted to broadcast information of the at least one candidate cooperating set determined to all UEs in the super-cell;

a channel information obtaining unit, adapted to receive channel information fed back by each of the UEs;

a cooperating set selecting unit, adapted to select for each of the UEs a cooperating set from the at least one candidate cooperating set according to the channel information fed back by each of the UEs; and a scheduling unit, adapted to determine all cooperating sets in the super-cell and UEs participating in cooperation in each cooperating set according to information of the cooperating set selected by each of the UEs.

According to yet another embodiment of the present invention, a UE is provided. The UE includes:

a cooperating set selecting unit, adapted to select a cooperating set from all candidate cooperating sets broadcasted by a central controller of a super-cell as a cooperating set of the UE; and a cooperating set information feedback unit, adapted to feed back information of the cooperating set selected to the central controller of the super-cell.

According to still yet another embodiment of the present invention, another UE is provided. The UE includes:

a candidate cooperating set information receiving unit, adapted to receive information of all candidate cooperating sets broadcasted by a central controller of a super-cell;

a measuring unit, adapted to measure all the candidate cooperating sets; and a channel information feedback unit, adapted to feed back channel information obtained by measurement to the central controller.

As can be seen, on the one hand, the method for coordinated multi-cell transmission according to embodiments of the present invention enables the UE to select, according to the channel information or geographical location of the UE, a cooperating set for itself from a finite number of candidate cooperating sets determined by the central controller in the super-cell. Therefore, compared with the manner of defining cooperating sets in advance, the method of an embodiment of the present invention can be implemented more flexibly and can achieve a higher coordination gain. On the other hand, the candidate cooperating sets involved in the scheduling are determined by the central controller and the number of the candidate cooperating sets is finite. Therefore, compared with the manner of determining the cooperating sets by the UEs completely, the complexity for scheduling of the cooperating sets in the method of an embodiment of the present invention is greatly reduced. As can be seen, because of considering both the performance of the coordinated transmission and the impact of scheduling complexity of the coordinated transmission, the method for dynamically determining the cells and UEs participating in the coordinated transmission in the super-cell, the central controller and the UE according to the embodiments of the present invention have a higher coordinated transmission performance and lower complexity, and is therefore feasible.

BRIEF DESCRIPTION OF THE DRAWINGS

Hereinafter, the present invention will be described in detail with reference to accompanying drawings and embodiments to make the features and merits therein clearer to those with ordinary skill in the art. In the drawings.

DETAILED DESCRIPTION OF THE INVENTION

Figure 1:
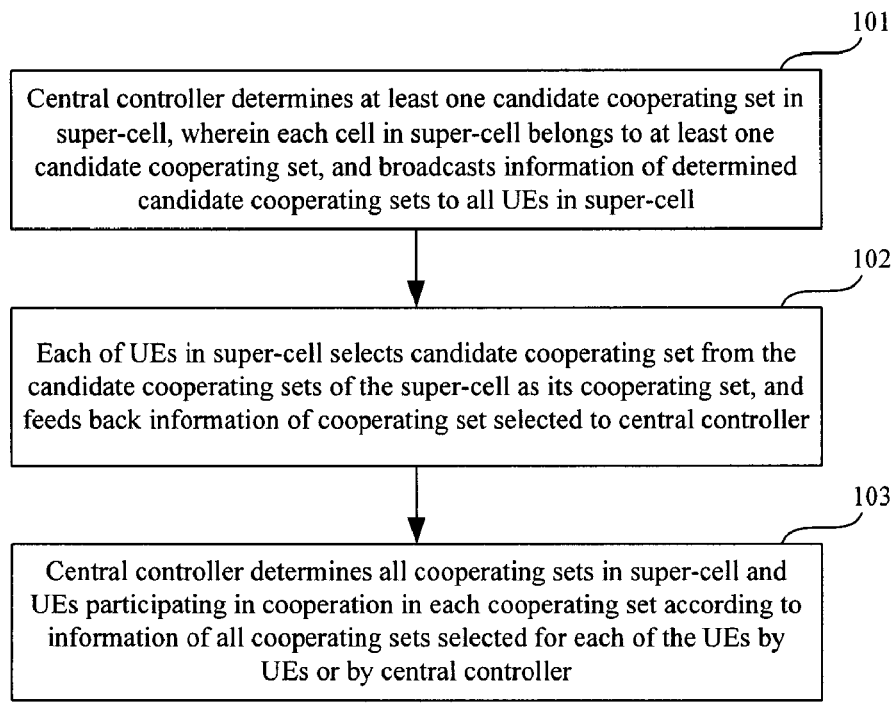
FIG. 1 is a flowchart illustrating a method for coordinated multi-cell transmission according to an embodiment of the present invention.

Embodiments of the present invention provide a method for coordinated multi-cell transmission. The procedure of the method is shown in FIG. 1, mainly includes the following operations.

Step 101: A central controller determines at least one candidate cooperating set in a super-cell. Each cell in the super-cell belongs to at least one candidate cooperating set. Then, the central controller broadcasts information of the candidate cooperating set(s) to all UEs in the super-cell.

Step 102: Each of all the UEs in the super-cell selects a candidate cooperating set from the candidate cooperating sets of the super-cell as its cooperating set, and feeds back information of its cooperating set to the central controller.

In this step, UE may select its cooperating set through various manners. For example, the UE may firstly measure the candidate cooperating sets in the super-cell, and select a candidate cooperating set which has a largest Signal-to-Noise Ratio (SINR) as its cooperating set according to Long-Term Channel Statistics or instant channel information obtained by measurement. Or, the UE may directly select a candidate cooperating set where the UE is located as its cooperating set according to a geographical location of the UE.

As an alternative of step 102, step 102' may be performed after step 101.

Step 102': All the UEs in the super-cell respectively measure the candidate cooperating sets in the super-cell, and feed back channel information obtained by measurement to the central controller. The central controller selects for each UE a candidate cooperating set as the cooperating set of the UE according to the channel information fed back by the UE.

In the above step 102', the channel information may be the Long-Term Channel Statistics or the instant channel information obtained by measurement. The central controller will select for each UE a candidate cooperating set having a largest SINR as the cooperating set of the UE according to the Long-Term Channel Statistics or instant channel information fed back by the UE.

After the step 102 or 102', step 103 will be performed.

Step 103: The central controller determines all cooperating sets in the super-cell and UEs participating in cooperation in each cooperating set according to information of all the cooperating sets which are selected by the UEs or selected by the central controller for each of the UEs.

After determining all the cooperating sets in the supper-cell and the UEs participating in the cooperation in each cooperating set in step 103, each cooperating set can transmit downlink signaling and data to the UEs participating in the cooperation in the cooperating set, so as to realize the coordinated multi-cell transmission.

In order to implement the above step 103, the central controller in the super-cell needs to know a channel condition of each UE. Thus, all the UEs in the super-cell need to measure their channel conditions dynamically and feed back channel information obtained by measurement to the central controller. Then, in step 103, the central controller performs joint scheduling according to the channel information fed back by the UEs and the information of the cooperating sets selected by the UEs, so as to determine all the cooperating sets in the super-cell and the UEs participating in the cooperation in each cooperating set.

According to an embodiment of the present invention, the step of determining all the cooperating sets in the super-cell and the UEs participating in the cooperation in each cooperating set by the central controller in step 103 may include the following steps.

Step 201: According to the information of the cooperating set selected by each UE and the channel information fed back by each UE, scheduling among all the UEs is performed in each candidate cooperating set to determine the UEs participating in the cooperation in each candidate cooperating set so as to maximize throughput or weighted throughput of the UEs participating in the cooperation in each candidate cooperating set.

In this step, a conventional scheduling algorithm such as a greedy algorithm or an exhaustive searching algorithm may be adopted to schedule among all the UEs in each candidate cooperating set. But it should be noted that, during the scheduling among all the UEs in each candidate cooperating set, the UEs participating in the cooperation in each candidate cooperating set should be the UEs selecting the candidate cooperating set as their cooperating set. In other words, the UEs that can be scheduled in a candidate cooperating set should select this candidate cooperating set as their cooperating set.

Step 202: A group formed by all the candidate cooperating sets is taken as a first group.

Step 203: A candidate cooperating set with a highest priority is selected from the first group and the selected candidate cooperating set is added into a second group.

The priority in this step may be throughput or weighted throughput of the candidate cooperating set.

Step 204: All candidate cooperating sets which are non-orthogonal with the candidate cooperating set added into the second group in step 203 are removed from the first group.

Herein, the non-orthogonal candidate cooperating sets refer to cooperating sets which cannot co-exist on a same resource block at the same time.

Step 205: It is determined whether the first group is null. If the first group is null, the current joint scheduling ends, candidate cooperating sets in the second group are taken as the candidate cooperating sets in the super-cell. Otherwise, step 203 is performed again.

Because all the UEs participating in the cooperation in all the candidate cooperating sets have been determined in step 201 through the scheduling among all the UEs in each candidate cooperating set, the UEs participating in the cooperation in each cooperating set may be determined according to a UE scheduling result in step 201 after the cooperating sets in the super-cell are determined.

Hereinafter, the method for coordinated multi-cell transmission according to this embodiment of the present invention will be described in detail with reference to an example.

Figure 2:
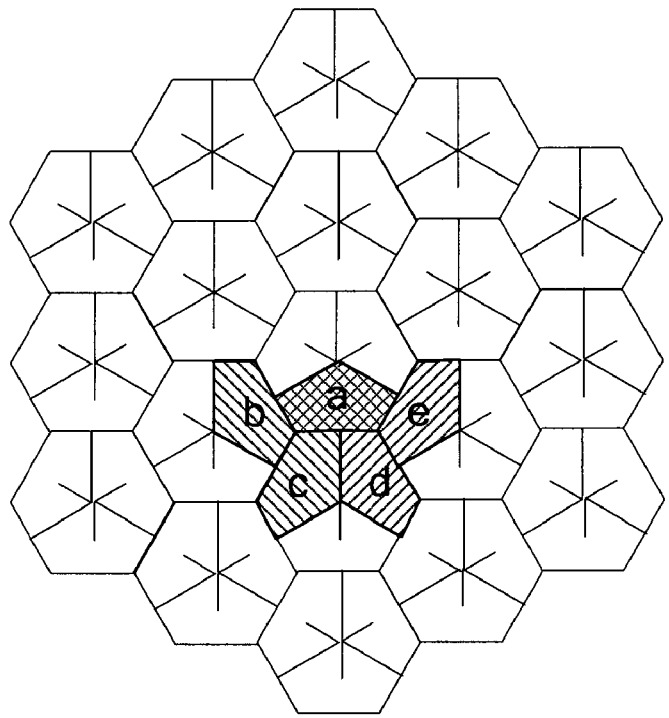
FIG. 2 is a schematic diagram illustrating a structure of a super-cell according to an embodiment of the present invention.

FIG. 2 shows a structure of a super-cell according to an embodiment of the present invention. As shown in FIG. 2, the super-cell includes 57 cells, and a central controller of the super-cell defines 38 candidate cooperating sets. Each cell belongs to two candidate cooperating sets. For example, cell a in FIG. 2 belongs to cooperating set 1 and cooperating set 2. The cooperating set 1 includes cells a, b and c, and the cooperating set 2 includes cells a, d and e. After the central controller of the super-cell broadcasts information of the candidate cooperating sets to all the UEs in the super-cell, each UE selects a cooperating set from the 38 candidate cooperating sets as its cooperating set according to large-scale channel information or geographical location of the UE. For example, UE1 in the coverage area of cell a may select Set 1 as its cooperating set. After knowing the cooperating sets selected by all the UEs, the central controller respectively schedules among all the UEs in the 38 candidate cooperating sets according to the channel information fed back by the UEs, and determines the UEs participating in the cooperation in each candidate cooperating set. Finally, according to priorities of the candidate cooperating sets (e.g. throughput or weighted throughput of the candidate cooperating sets), the central controller determines 19 orthogonal cooperating sets among the 38 candidate cooperating sets and the UEs participating in the cooperation in the 19 cooperating sets, so as to realize the coordinated multi-cell transmission.

As can be seen from the above, on the one hand, the method for coordinated multi-cell transmission according to embodiments of the present invention enables the UE to select, according to the channel information or geographical location of the UE, a cooperating set for itself from a finite number of candidate cooperating sets determined by the central controller in the super-cell. Therefore, compared with the manner of defining cooperating sets in advance, the method of an embodiment of the present invention can be implemented more flexibly and can achieve a higher coordination gain. On the other hand, the candidate cooperating sets involved in the scheduling are determined by the central controller and the number of the candidate cooperating sets is finite. Therefore, compared with the manner of determining the cooperating sets by the UEs completely, the complexity for scheduling of the cooperating sets in the method of an embodiment of the present invention is greatly reduced. As can be seen, because of considering both the performance of the coordinated transmission and the impact of scheduling complexity of the coordinated transmission, the method for dynamically determining the cells and UEs participating in the coordinated transmission in the super-cell according to the embodiments of the present invention has a higher coordinated transmission performance and lower complexity, and is therefore feasible.

In another embodiment of the present invention, the step of determining all the cooperating sets in the super-cell and the UEs participating in the cooperation in each cooperating set by the central controller in step 103 may include the following steps.

Step 211: All the candidate cooperating sets in the super-cell are divided into at least two groups and it is guaranteed that all the candidate cooperating sets in each group are orthogonal. Each group of candidate cooperating sets is taken as a coordinated transmission mode.

Step 212: The at least two coordinated transmission modes are multiplexed by a Time Division Multiplexing (TDM) manner. Specifically, a downlink slot is allocated for each coordinated transmission mode. During the downlink slot corresponding to one coordinated transmission mode, the scheduling among all the UEs in each candidate cooperating set in the coordinated transmission mode is performed according to the information of the cooperating sets selected by all the UEs and the channel information fed back by all the UEs, so that the weighted throughput of all the UEs scheduled in each candidate cooperating set is maximized so as to determine all the cooperating sets in the super-cell and the UEs in each cooperating set during the downlink slot corresponding to the coordinated transmission mode.

It should be noted that, during the scheduling among all the UEs in each candidate cooperating set in step 212, the UEs participating in the scheduling should be the UEs selecting the candidate cooperating set as their cooperating set.

Figure 3:
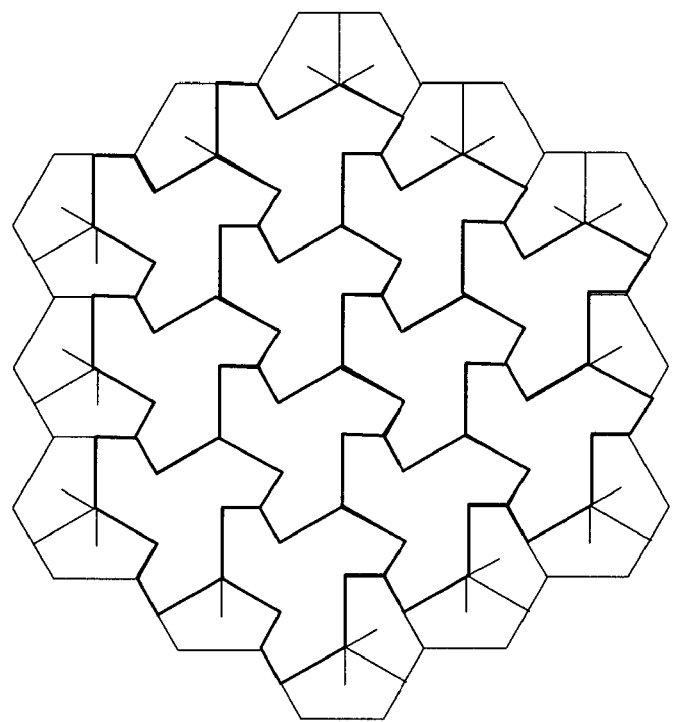
FIG. 3 is a schematic diagram illustrating a coordinated transmission mode according to an embodiment of the present invention.
Figure 4:
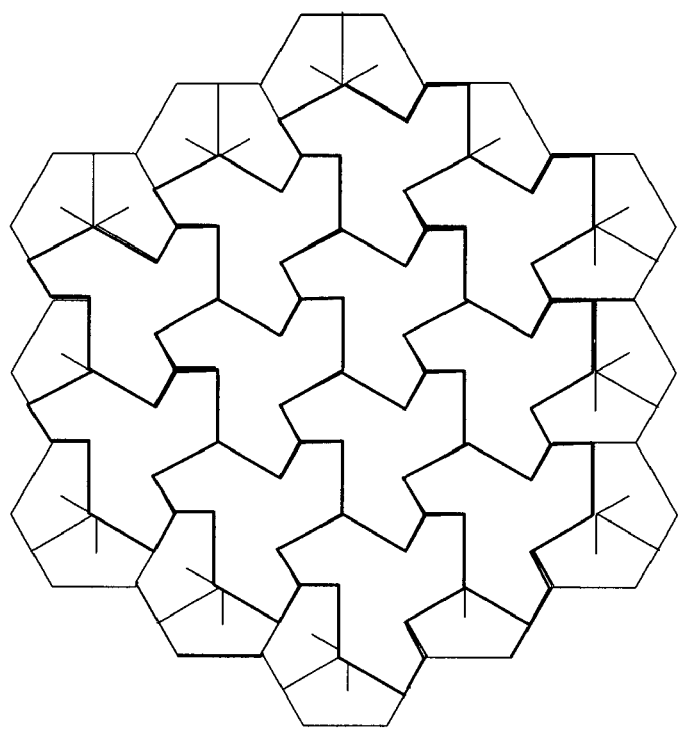
FIG. 4 is a schematic diagram illustrating another coordinated transmission mode according to an embodiment of the present invention.

Herein, it is still supposed that the super-cell in FIG. 2 includes 57 cells, that the central controller of the super-cell defines 38 candidate cooperating sets, and that each cell belongs to two candidate cooperating sets. The central controller divides the 38 candidate cooperating sets into two coordinated transmission modes. FIG. 3 shows a coordinated transmission mode according to this embodiment. FIG. 4 shows another coordinated transmission mode according to this embodiment. It can be seen from FIG. 3 and FIG. 4 that, the two coordinated transmission modes in this embodiment respectively include 19 cooperating sets. In this embodiment, the TDM manner is adopted to ensure that the LTE-A system adopts only one coordinated transmission mode during one downlink slot. In other words, during one downlink slot, the central controller only needs to schedule among all the UEs in the 19 cooperating sets in one coordinated transmission mode rather than in the 38 cooperating sets. Therefore, the method for coordinated multi-cell transmission of this embodiment may further decrease the complexity for scheduling of the cooperating sets.

In still another embodiment of the present invention, the step of determining all the cooperating sets in the super-cell and the UEs participating in the cooperation in each cooperating set by the central controller in step 103 includes the following steps.

Step 221: All the candidate cooperating sets in the super-cell are divided into at least two groups and it is guaranteed that all the candidate cooperating sets in each group are orthogonal. Each group of candidate cooperating sets is taken as a coordinated transmission mode.

Step 222: The at least two coordinated transmission modes are multiplexed by the FDM manner. Specifically, a downlink frequency band is allocated for each coordinated transmission mode. During the downlink frequency band corresponding to one coordinated transmission mode, the scheduling among all the UEs in each candidate cooperating set in the coordinated transmission mode is performed according to the information of the cooperating sets selected by all the UEs and the channel information fed back by all the UEs so that the weighted throughput of all the UEs scheduled in each candidate cooperating set is maximized, so as to determine all the cooperating sets in the super-cell and the UEs in each cooperating set in the downlink frequency band corresponding to the coordinated transmission mode.

Similarly, during the scheduling among all the UEs in each candidate cooperating set in step 222, the UEs participating in the scheduling should be the UEs selecting the candidate cooperating set as their cooperating set.

Herein, it is still supposed that the super-cell in FIG. 2 includes 57 cells, that the central controller of the super-cell defines 38 candidate cooperating sets, and that each cell belongs to two candidate cooperating sets. The central controller divides the 38 candidate cooperating sets into two coordinated transmission modes. FIG. 3 shows a coordinated transmission mode according to this embodiment. FIG. 4 shows another coordinated transmission mode according to this embodiment. It can be seen from FIG. 3 and FIG. 4 that the two coordinated transmission modes in this embodiment respectively include 19 cooperating sets. The coordinated transmission modes occupy different downlink frequency bands respectively. In this embodiment, through the FDM manner, the central controller only needs to perform, in one frequency band, the scheduling among all the UEs in the 19 cooperating sets in one coordinated transmission mode rather than in the 38 cooperating sets. Therefore, the method for coordinated multi-cell transmission of this embodiment may further decrease the complexity of scheduling of the cooperating sets.

Figure 5:
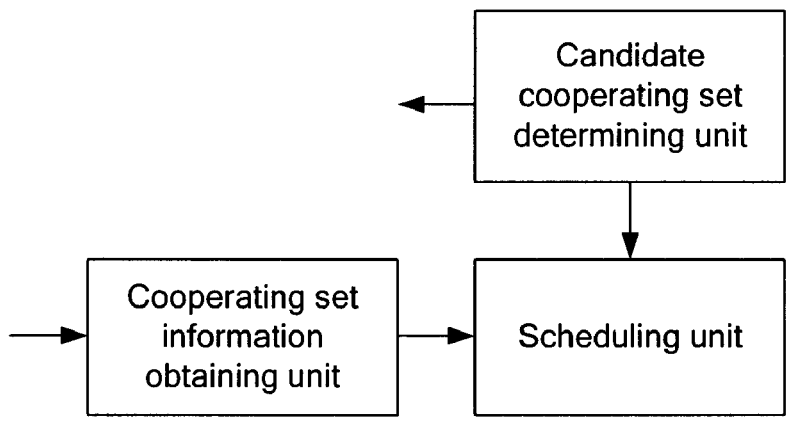
FIG. 5 is a schematic diagram illustrating a structure of a central controller in a super-cell according to an embodiment of the present invention.

Besides the method for coordinated multi-cell transmission according to the above embodiments, embodiments of the present invention also provide a central controller in a super-cell for implementing the coordinated transmission in the super-cell. An internal structure of the central controller is shown in FIG. 5 and mainly includes:

a candidate cooperating set determining unit, adapted to determine at least one candidate cooperating set in a super-cell, wherein each cell in the super-cell belongs to at least one candidate cooperating set; and adapted to broadcast information of the candidate cooperating set(s) determined to all UEs in the super-cell;

a cooperating set information obtaining unit, adapted to receive information of a cooperating set of a UE fed back by the UE; and a scheduling unit, adapted to determine all cooperating sets in the super-cell and UEs participating in cooperation in each cooperating set according to information of the cooperating sets selected by all the UEs.

Figure 6:
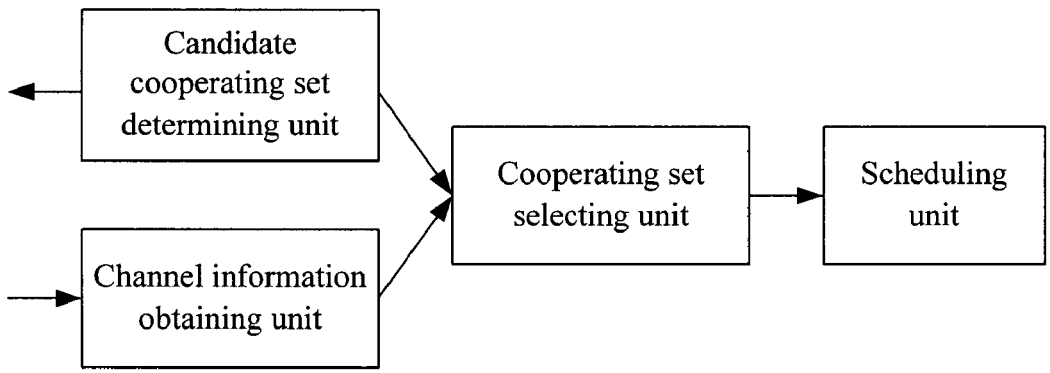
FIG. 6 is a schematic diagram illustrating another structure of the central controller in the super-cell according to an embodiment of the present invention.

Embodiments of the present invention also provide another central controller in the super-cell for implementing the coordinated transmission in the super-cell. An internal structure of the central controller is shown in FIG. 6 and mainly includes:

a candidate cooperating set determining unit, adapted to determine at least one candidate cooperating set in a super-cell, wherein each cell in the super-cell belongs to at least one candidate cooperating set; and adapted to broadcast information of the candidate cooperating set(s) determined to all UEs in the super-cell;

a channel information obtaining unit, adapted to receive channel information fed back by each UE;

a cooperating set selecting unit, adapted to select for each UE a cooperating set from the candidate cooperating sets according to the channel information fed back by the UE; and a scheduling unit, adapted to determine all cooperating sets in the super-cell and UEs participating in cooperation in each cooperating set according to information of the cooperating set selected by each UE.

The scheduling units inside the central controller according to the above two embodiments may include:

a UE scheduling module, adapted to schedule among all the UEs in each candidate cooperating set according to the information of the cooperating set selected by each UE and the channel information fed back by each UE, determine the UEs participating in the cooperation in each candidate cooperating set to maximize weighted throughput of the UEs participating in the cooperation in each candidate cooperating set; and a cooperating set selecting module, adapted to take a group consisting of all the candidate cooperating sets as a first group, select a candidate cooperating set with a highest priority from the first group as a cooperating set of the super-cell, and add the selected candidate cooperating set into a second group; remove from the first group all candidate cooperating sets which are non-orthogonal with the candidate cooperating set added into the second group, and return to the step of selecting the candidate cooperating set with the highest priority from the first group until the first group is null.

According to another embodiment of the present invention, the above scheduling unit may include:

a coordinated transmission mode dividing module, adapted to divide all candidate cooperating sets in the super-cell into at least two groups, wherein it is guaranteed that all candidate cooperating sets in each group are orthogonal, and take each group of candidate cooperating sets as a coordinated transmission mode; and a UE scheduling module, adapted to allocate a downlink slot for each coordinated transmission mode; perform, during a slot corresponding to one coordinated transmission mode, scheduling among all the UEs in each candidate cooperating set in the coordinated transmission mode according to information of the cooperating sets selected by all the UEs and the channel information fed back by all the UEs, so as to maximize the weighted throughput of all the UEs scheduled in each candidate cooperating set.

According to yet another embodiment of the present invention, the above scheduling unit may include:

a coordinated transmission mode dividing module, adapted to divide all candidate cooperating sets in the super-cell into at least two groups, wherein it is guaranteed that all candidate cooperating sets in each group are orthogonal; and take each group of candidate cooperating sets as a coordinated transmission mode; and a UE scheduling module, adapted to allocate a downlink frequency band for each coordinated transmission mode; perform, within a downlink frequency band corresponding to one coordinated transmission mode, scheduling among all the UEs in each candidate cooperating set in the coordinated transmission mode according to information of the cooperating sets selected by all the UEs and the channel information fed back by all the UEs, so as to maximize the weighted throughput of all the UEs scheduled in each candidate cooperating set.

Figure 7:
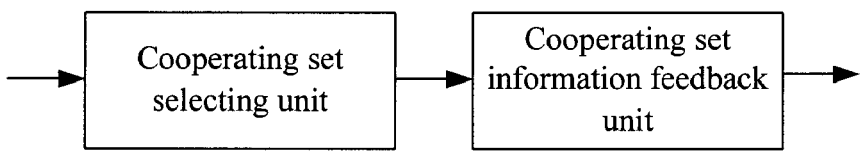
FIG. 7 is a schematic diagram illustrating a structure of a UE according to an embodiment of the present invention.

Embodiments of the present invention also provide a UE for communicating with the above central controller. An internal structure of the UE is shown in FIG. 7 and mainly includes:

a cooperating set selecting unit, adapted to select a cooperating set from all candidate cooperating sets broadcasted by the central controller of the super-cell as a cooperating set of the UE; and a cooperating set information feedback unit, adapted to feed back information of the cooperating set selected to the central controller of the super-cell.

The above UE should further include: a channel information feedback unit, adapted to dynamically measure a channel condition of the UE, and feed back channel information obtained by dynamic measurement to the central controller.

Figure 8:
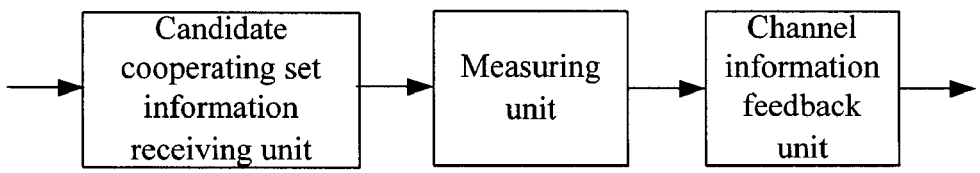
FIG. 8 is a schematic diagram illustrating another structure of the UE according to an embodiment of the present invention.

Another embodiment of the present invention provides another UE for communicating with the above central controller. An internal structure of the UE is shown in FIG. 8, and mainly includes:

a candidate cooperating set information receiving unit, adapted to receive information of all candidate cooperating sets broadcasted by the central controller of the super-cell;

a measuring unit, adapted to measure all the candidate cooperating sets; and a channel information feedback unit, adapted to feed back channel information obtained by measurement to the central controller.

The channel information feedback unit is further adapted to dynamically measure a channel condition of the UE, and feed back channel information obtained by dynamic measurement to the central controller.

Through cooperation between the central controller and the UEs, the coordinated multi-cell transmission can be realized. Since both the performance of the coordinated transmission and the scheduling complexity of the coordinated transmission are considered, the embodiments of the present invention have a higher coordinated transmission performance and lower complexity, therefore are feasible.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A method for coordinated multi-cell transmission, comprising:

determining, by a central controller, at least one candidate cooperating set in a super-cell, wherein each cell in the super-cell belongs to at least one candidate cooperating set, and broadcasting information of the at least one candidate cooperating set determined to all User Equipments (UEs) in the super-cell;

selecting, by each of the UEs, a candidate cooperating set from the at least one candidate cooperating set as a cooperating set of the UE; and feeding back information of the cooperating set to the central controller; and determining, by the central controller, all cooperating sets in the super-cell and UEs participating in cooperation in each cooperating set according to the information of the cooperating set fed back by each of the UEs.

2. The method of claim 1, wherein selecting by each of the UEs the cooperating set from the at least one candidate cooperating set as the cooperating set of the UE comprises:

selecting, by each of the UEs, the candidate cooperating set where the UE is located as the cooperating set of the UE according to a geographical location of the UE.

3. The method of claim 1, wherein selecting by each of the UEs the cooperating set from the at least one candidate cooperating set as the cooperating set of the UE comprises:

measuring, by each of the UEs, the at least one candidate cooperating set, selecting the candidate cooperating set from the at least one candidate cooperating set as the cooperating set of the UE according to channel information obtained by measurement.

4. The method of claim 3, wherein the channel information comprises: long-term channel statistics or instant channel information;

wherein selecting the candidate cooperating set from the at least one candidate cooperating set as the cooperating set of the UE according to the channel information obtained by measurement comprises: selecting a candidate cooperating set with a largest signal-to-noise ratio as the cooperating set of the UE.

5. The method of claim 1, wherein determining the cooperating sets in the super-cell and the UEs participating in the cooperation in each cooperating set comprises:
scheduling among all the UEs in each candidate cooperating set according to the information of the cooperating set selected by each UE and the channel information fed back by each UE, and determining the UEs participating in the cooperation in each cooperating set to maximize throughput or weighted throughput of the UEs participating in the cooperation in each cooperating set;
taking a group consisting of all candidate cooperating sets as a first group;
a1) selecting a candidate cooperating set with a highest priority from the first group as a cooperating set of the super-cell, and adding the selected cooperating set into a second group;
removing, from the first group, all candidate cooperating sets that are non-orthogonal with the candidate cooperating set added into the second group, returning to operation a1) until the first group is null.

6. The method of claim 1, wherein determining the cooperating sets in the super-cell and the UEs participating in the cooperation in each cooperating set comprises:
dividing all candidate cooperating sets in the super-cell into at least two groups, wherein it is guaranteed that all candidate cooperating sets in each group are orthogonal, and taking each group of candidate cooperating sets as a coordinated transmission mode;
multiplexing the at least two coordinated transmission modes in a time division multiplexing manner; allocating a downlink slot for each coordinated transmission mode; and performing, during a slot corresponding to one coordinated transmission mode, the scheduling among all the UEs in each candidate cooperating set in the coordinated transmission mode according to the information of the cooperating sets selected by all the UEs and the channel information fed back by all the UEs to maximize throughput or weighted throughput of the UEs scheduled in each candidate cooperating set.

7. The method of claim 1, wherein determining the cooperating sets in the super-cell and the UEs participating in the cooperation in each cooperating set comprises:
dividing all candidate cooperating sets in the super-cell into at least two groups, wherein it is guaranteed that all candidate cooperating sets in each group are orthogonal, and taking each group of candidate cooperating sets as a coordinated transmission mode;
multiplexing the at least two coordinated transmission modes in a frequency division multiplexing manner; allocating a downlink frequency band for each coordinated transmission mode; and performing, during a downlink frequency band corresponding to one coordinated transmission mode, the scheduling among all the UEs in each candidate cooperating set in the coordinated transmission mode according to the information of the cooperating sets selected by all the UEs and the channel information fed back by all the UEs to maximize throughput or weighted throughput of the UEs scheduled in each candidate cooperating set.

8. A method for coordinated multi-cell transmission, comprising:
determining, by a central controller, at least one candidate cooperating set in a super-cell, wherein each cell in the super-cell belongs to at least one candidate cooperating set, and broadcasting information of the at least one candidate cooperating set to all User Equipments (UEs) in the super-cell;
measuring, by each of all the UE, the at least one candidate cooperating set, and feeding back channel information obtained by measurement to the central controller; and
selecting, by the central controller, a cooperating set from the at least one candidate cooperating set for each of the UEs according to the channel information fed back by each of the UEs, and determining all cooperating sets in the super-cell and UEs participating in cooperation in each cooperating set according to the cooperating set selected for each of the UEs.

9. The method of claim 8, wherein the channel information comprises: long-term channel statistics or instant channel information;
wherein selecting by the central controller the candidate cooperating set from the at least one candidate cooperating set for each of the UEs according to the channel information fed back by each of the UEs comprises: selecting a candidate cooperating set with a largest signal-to-noise ratio for each of the UEs as the cooperating set of each of the UEs.

10. The method of claim 8, wherein determining the cooperating sets in the super-cell and the UEs participating in the cooperation in each cooperating set comprises:
scheduling among all the UEs in each candidate cooperating set according to the information of the cooperating set selected by each UE and the channel information fed back by each UE, and determining the UEs participating in the cooperation in each cooperating set to maximize throughput or weighted throughput of the UEs participating in the cooperation in each cooperating set;
taking a group consisting of all candidate cooperating sets as a first group;
a1) selecting a candidate cooperating set with a highest priority from the first group as a cooperating set of the super-cell, and adding the selected cooperating set into a second group;
removing, from the first group, all candidate cooperating sets that are non-orthogonal with the candidate cooperating set added into the second group, returning to the step a1) until the first group is null.

11. The method of claim 10, wherein the priority is throughput or weighted throughput of the candidate cooperating set.

12. The method of claim 8, wherein determining the cooperating sets in the super-cell and the UEs participating in the cooperation in each cooperating set comprises:
dividing all candidate cooperating sets in the super-cell into at least two groups, wherein it is guaranteed that all candidate cooperating sets in each group are orthogonal, and taking each group of candidate cooperating sets as a coordinated transmission mode;
multiplexing the at least two coordinated transmission modes in a time division multiplexing manner; allocating a downlink slot for each coordinated transmission mode; and performing, during a slot corresponding to one coordinated transmission mode, the scheduling among all the UEs in each candidate cooperating set in the coordinated transmission mode according to the information of the cooperating sets selected by all the UEs and the channel information fed back by all the UEs to maximize throughput or weighted throughput of the UEs scheduled in each candidate cooperating set.

13. The method of claim 8, wherein determining the cooperating sets in the super-cell and the UEs participating in the cooperation in each cooperating set comprises:
- dividing all candidate cooperating sets in the super-cell into at least two groups, wherein it is guaranteed that all candidate cooperating sets in each group are orthogonal, and taking each group of candidate cooperating sets as a coordinated transmission mode;
- multiplexing the at least two coordinated transmission modes in a frequency division multiplexing manner; allocating a downlink frequency band for each coordinated transmission mode; and performing, during a downlink frequency band corresponding to one coordinated transmission mode, the scheduling among all the UEs in each candidate cooperating set in the coordinated transmission mode according to the information of the cooperating sets selected by all the UEs and the channel information fed back by all the UEs to maximize throughput or weighted throughput of the UEs scheduled in each candidate cooperating set.

14. A central controller of a super-cell, comprising:
- a candidate cooperating set determining unit to determine at least one candidate cooperating set in a super-cell, wherein each cell in the super-cell belongs to at least one candidate cooperating set; and adapted to broadcast information of the at least one candidate cooperating set determined to all UEs in the super-cell;
- a cooperating set information obtaining unit to receive information of a cooperating set of a UE fed back by the UE; and
- a scheduling unit to determine all cooperating sets in the super-cell and UEs participating in cooperation in each cooperating set according to information of the cooperating sets selected by all the UEs.

15. The central controller of claim 14, wherein the scheduling unit comprises:
- a UE scheduling module to schedule among all the UEs in each candidate cooperating set according to the information of the cooperating set selected by each of the UEs and the channel information fed back by each of the UEs, determine the UEs participating in the cooperation in each candidate cooperating set to maximize weighted throughput of the UEs participating in the cooperation in each candidate cooperating set; and
- a cooperating set selecting module to take a group consisting of all the candidate cooperating sets as a first group, select a candidate cooperating set with a highest priority from the first group as a cooperating set of the super-cell, and add the selected candidate cooperating set into a second group; remove all candidate cooperating sets which are non-orthogonal with the candidate cooperating set added into the second group from the first group, and return to the step of selecting the candidate cooperating set with the highest priority from the first group until the first group is null.

16. The central controller of claim 14, wherein the scheduling unit comprises:
- a coordinated transmission mode dividing module to divide all candidate cooperating sets in the super-cell into at least two groups, wherein it is guaranteed that all candidate cooperating sets in each group are orthogonal, and take each group of candidate cooperating sets as a coordinated transmission mode; and
- a UE scheduling module to allocate a downlink slot for each coordinated transmission mode, and perform, during a slot corresponding to one coordinated transmission mode, scheduling among all the UEs in each candidate cooperating set in the coordinated transmission mode according to information of the cooperating sets selected by all the UEs and the channel information fed back by all the UEs to maximize weighted throughput of all the UEs scheduled in each candidate cooperating set.

17. The central controller of claim 14, wherein the scheduling module comprises:
- a coordinated transmission mode dividing module to divide all candidate cooperating sets in the super-cell into at least two groups, wherein it is guaranteed that all candidate cooperating sets in each group are orthogonal, and take each group of candidate cooperating sets as a coordinated transmission mode; and
- a UE scheduling module to allocate a downlink frequency band for each coordinated transmission mode, and perform, within a downlink frequency band corresponding to one coordinated transmission mode, scheduling among all the UEs in each candidate cooperating set in the coordinated transmission mode according to information of the cooperating sets selected by all the UEs and the channel information fed back by all the UEs to maximize weighted throughput of all the UEs scheduled in each candidate cooperating set.

18. A central controller of a super-cell, comprising:
- a candidate cooperating set determining unit to determine at least one candidate cooperating set in the super-cell, wherein each cell in the super-cell belongs to at least one candidate cooperating set; and adapted to broadcast information of the at least one candidate cooperating set determined to all UEs in the super-cell;
- a channel information obtaining unit to receive channel information fed back by each of the UEs;
- a cooperating set selecting unit to select for each of the UEs a cooperating set from the at least one candidate cooperating set according to the channel information fed back by each of the UEs; and
- a scheduling unit to determine all cooperating sets in the super-cell and UEs participating in cooperation in each cooperating set according to information of the cooperating set selected by each of the UEs.

19. The central controller of claim 18, wherein the scheduling unit comprises:
- a UE scheduling module to schedule among all the UEs in each candidate cooperating set according to the information of the cooperating set selected by each of the UEs and the channel information fed back by each of the UEs, determine the UEs participating in the cooperation in each candidate cooperating set to maximize weighted throughput of the UEs participating in the cooperation in each candidate cooperating set; and
- a cooperating set selecting module to take a group consisting of all the candidate cooperating sets as a first group, select a candidate cooperating set with a highest priority from the first group as a cooperating set of the super-cell, and add the selected candidate cooperating set into a second group; remove all candidate cooperating sets which are non-orthogonal with the candidate cooperating set added into the second group from the first group, and return to the step of selecting the candidate cooperating set with the highest priority from the first group until the first group is null.

20. The central controller of claim 18, wherein the scheduling unit comprises:
- a coordinated transmission mode dividing module to divide all candidate cooperating sets in the super-cell into at least two groups, wherein it is guaranteed that all candidate cooperating sets in each group are orthogonal, and take each group of candidate cooperating sets as a coordinated transmission mode; and a UE scheduling module to allocate a downlink slot for each coordinated transmission mode, and perform, during a slot corresponding to one coordinated transmission mode, scheduling among all the UEs in each candidate cooperating set in the coordinated transmission mode according to information of the cooperating sets selected by all the UEs and the channel information fed back by all the UEs to maximize weighted throughput of all the UEs scheduled in each candidate cooperating set.

21. The central controller of claim 18, wherein the scheduling module comprises:

a coordinated transmission mode dividing module to divide all candidate cooperating sets in the super-cell into at least two groups, wherein it is guaranteed that all candidate cooperating sets in each group are orthogonal, and take each group of candidate cooperating sets as a coordinated transmission mode; and a UE scheduling module to allocate a downlink frequency band for each coordinated transmission mode, and perform, within a downlink frequency band corresponding to one coordinated transmission mode, scheduling among all the UEs in each candidate cooperating set in the coordinated transmission mode according to information of the cooperating sets selected by all the UEs and the channel information fed back by all the UEs to maximize weighted throughput of all the UEs scheduled in each candidate cooperating set.

22. A User Equipment (UE), comprising:

a cooperating set selecting unit to select a cooperating set from all candidate cooperating sets broadcasted by a central controller of a super-cell as a cooperating set of the UE; and a cooperating set information feedback unit to feed back information of the cooperating set selected to the central controller of the super-cell.

23. The UE of claim 22, further comprising:

a channel information feedback unit to dynamically measure a channel condition of the UE, and feed back channel information obtained by measurement to the central controller.

* * * * *